United States Patent
Stevenson et al.

(10) Patent No.: US 6,883,699 B2
(45) Date of Patent: Apr. 26, 2005

(54) RIVET WITH SLIDING CAP FOR FRICTION STIR RIVETING

(75) Inventors: Robin Stevenson, Bloomfield, MI (US); Pei-Chung Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 226 days.

(21) Appl. No.: 10/337,017

(22) Filed: Jan. 6, 2003

(65) Prior Publication Data

US 2004/0129762 A1 Jul. 8, 2004

(51) Int. Cl.[7] .......................... B23K 20/12; F16B 37/06
(52) U.S. Cl. ................... 228/112.1; 228/114.5; 29/525.14
(58) Field of Search ................. 228/112.1, 114.5, 228/2.1, 1.1; 411/82, 21, 171, 180, 930; 29/402.01, 402.13, 525.06, 525.14

(56) References Cited

U.S. PATENT DOCUMENTS

| | | | |
|---|---|---|---|
| 3,768,147 A | * 10/1973 | Berry et al. | ............. 228/112.1 |
| 3,848,389 A | * 11/1974 | Gapp et al. | ................. 411/504 |
| 4,850,772 A | 7/1989 | Jenkins | |
| 5,111,570 A | * 5/1992 | Baumgarten et al. | .... 29/402.13 |
| 5,469,617 A | * 11/1995 | Thomas et al. | .......... 29/889.21 |
| 5,975,406 A | 11/1999 | Mahoney | |
| 6,053,391 A | 4/2000 | Heidemann et al. | |
| 6,213,379 B1 | * 4/2001 | Takeshita et al. | ......... 228/112.1 |
| 6,230,958 B1 | * 5/2001 | Coletta et al. | ........... 228/114.5 |
| 6,253,987 B1 | * 7/2001 | Coletta et al. | ........... 228/114.5 |
| 6,386,419 B2 | * 5/2002 | Coletta et al. | ................ 228/2.3 |
| 6,460,750 B1 | * 10/2002 | Coletta et al. | ................ 228/2.1 |
| 6,702,535 B1 | * 3/2004 | Stevenson et al. | ............. 411/82 |
| 2002/0125297 A1 | 9/2002 | Stol et al. | |

* cited by examiner

Primary Examiner—Jonathan Johnson
(74) Attorney, Agent, or Firm—Kathryn A. Marra

(57) ABSTRACT

A friction stir rivet is rotated and driven through a first fusible workpiece into an engaged second fusible workpiece, causing local portions of the first and second workpieces to plasticize. A slideable cap contacts the exposed surface of the first workpiece shortly after the process begins. The contact causes the cap to act as a retaining element, limiting the escape of plasticized material from stir site. Once the rivet is driven into the first and second workpieces, rotation ceases and the plasticized material hardens around the rivet. A weld is thus created, joining the workpieces and encompassing the rivet, which provides additional mechanical strength.

8 Claims, 3 Drawing Sheets

RIVET WITH SLIDING CAP FOR FRICTION STIR RIVETING

TECHNICAL FIELD

This invention relates to friction stir welding and riveting, more particularly, to methods of joining multiple workpieces using a stir rivet to create a mechanical weld, an interweld, and a diffusion bond.

BACKGROUND OF THE INVENTION

Friction stir welding (FSW) is a method used to join metal workpieces. The method generally uses a cylindrical, shouldered tool with a profiled pin that is rotated at the joint line between two workpieces while being traversed along the joint line. The rotary motion of the tool generates frictional heat which serves to soften and plasticize the workpieces. This softened material, contributed by both workpieces, intermingles and is consolidated by the pin shoulder. As the pin moves laterally the frictional heating is reduced and the softened material hardens, creating a bond between the two workpieces. The best current understanding of the process is that no melting occurs and the weld is left in a fine-grained, hot worked condition with no entrapped oxides or gas porosity.

Stir rods used in conventional FSW are typically symmetrical cylinders having an enlarged fixed cap located on their upper side. The fixed cap used in conventional FSW does not engage a workpiece until the end of tool insertion, allowing a majority of the initially plasticized material to be expelled from the cavity before the cap creates a seal around the worksite. Current methods used in FSW do not teach or suggest methods of engaging a cap and a workpiece at the beginning of the process to retain the maximum amount of plasticized material in the weld zone.

SUMMARY OF THE INVENTION

This invention is based on a newly developed method which we call friction stir riveting. This method improves friction stir welding by using a stir rivet having a slideable cap. The stir rivet is rotated and advanced into a pair of workpieces to plasticize material around the rivet for stir welding the workpieces together. Near the beginning of the process, the slideable cap contacts the first workpiece. The contact between the cap and the first workpiece creates a partial seal, limiting the amount of plasticized material displaced out of the stir site. The rivet is then left in place to form a weld between the rivet and the solidified material.

The present invention utilizes a friction stir rivet having a body including an elongated cylindrical section and upper and lower stops at opposite ends of the cylindrical section. The cylindrical section of the body extends through a cap. A spring may extend between the cap and the upper stop, or the cap and a driving apparatus. An interlocking guide extends longitudinally along a portion of the cylindrical section. The interlocking guide on the cylindrical section may be a flat surface.

The cap has a central opening surrounding the cylindrical section. The central opening of the cap has an interlocking guide compatible with an interlocking guide of the cylindrical section, which causes the cap to rotate with the body. The interlocking guide in the central opening of the cap may be a flat surface. Alternatively, a threaded surface may be used to form a guide between the cylindrical section and the opening of the cap.

The upper stop forms the head of the rivet and provides a physical barrier, which can be used to compress the spring against the slideable cap, biasing the cap toward the lower stop. If the upper stop is not used to compress the spring, a retainer located on a rotary drive apparatus can compress the spring against the cap, biasing the cap against the lower stop. The upper stop limits upward travel of the cap.

The lower stop limits downward travel of the cap. The underside of the lower stop forms a lower end of the rivet which contacts the workpieces to be joined. The lower stop may be applied or formed after the cap is slid over the cylindrical section of the rivet. Once the cap is on the cylindrical section of the body the lower stop can be created or applied in any suitable manner, such as peening the lower end of the cylindrical section, deforming the lower end, pinning the lower end to act as the stop or to secure separate stop member, or by enlarging the lower end of the rivet with extra material.

A recessed socket is centrally located on the upper portion of the upper stop and is aligned with the rotational axis of the rivet. To rotate the rivet, a rotational rotary device is inserted into the recessed socket of the rivet.

The rivet, when rotated, locally softens and penetrates the workpieces, creating a cavity filled with plasticized material. Shortly after the lower end of the rivet penetrates the first workpiece, the slideable cap contacts the first workpiece to create a seal around the stir site, thereby limiting the amount of plasticized material displaced out of the cavity, ensuring that the plasticized material fills the cavity, and promoting intimate contact between the rivet and the plasticized material As the rivet advances into the workpieces, the cap slides up the cylindrical section of the rivet toward the upper stop, while the bias of the spring continues to press the cap against the first workpiece.

Upon reaching a desired depth, the rotary motion is stopped and the stir site is cooled to provide an internally welded joint maintained together partially by the shape of the rivet and partially by the welding of the components together.

Preferably, the cylindrical section of the rivet body has a smaller radial thickness than the lower stop to create a re-entrant portion along the cylindrical section. Alternatively, threads on the cylindrical section may be used to create re-entrant portions along the cylindrical section of the body. The re-entrant portion allows plasticized material to fill in above the lower stop, thereby, increasing the mechanical retention of the rivet in the workpieces.

The slideable cap limits oxygen access to the rivet during the stirring process by creating a seal between the rivet and the first workpiece. The reduced oxygen supply around the rivet reduces the formation of oxides on the body of the rivet. Reducing oxidation allows a better bond to form between the rivet and the workpieces.

The rivet should be formed of a relatively high melting point metal or refractory metal so that the rivet has a higher melting point than the workpieces to be joined. Preferably, the rivet should have a melting point that is at least 100° Fahrenheit higher and more preferably at least 200° Fahrenheit higher than workpieces, such as aluminum. Further, the rivet should be formed of a metal of substantially greater hardness than the metal workpieces to be joined. Exemplary metals include high carbon steel, titanium (e.g. titanium 6-4) and the like. Preferably, the rivet should be formed of a metal that is capable of forming a diffusion bond with the metal workpieces to be joined.

A driving apparatus is used to rotate and press the rivet into the metal workpieces to be joined. The rivet penetrates best when it is rotated at speeds between 4,500 and 27,000 revolutions per minute. The amount of pressure needed to allow the rivet to penetrate the metal workpiece depends upon the speed of rotation. The rate of penetration is increased when the amount of pressure applied is increased, or when the revolutions per minute are increased. Under good conditions, a friction stir rivet can penetrate aluminum at up to 27 millimeters per minute.

The foregoing description is directed, as an example, to joining aluminum metal workpieces with a stir rivet made of metal with a higher temperature melting point. However, it should be understood that other fusible materials may be joined using the same process with a proper selection of compatible materials. Thus, other metals and thermoplastics may also be successfully joined with a stirring rivet and process within the guidelines above described.

These and other features and advantages of the invention will be more fully understood from the following description of certain specific embodiments of the invention taken together with the accompanying drawings.

DESCRIPTION OF THE PREFERRED EMBODIMENT

Figure 1:
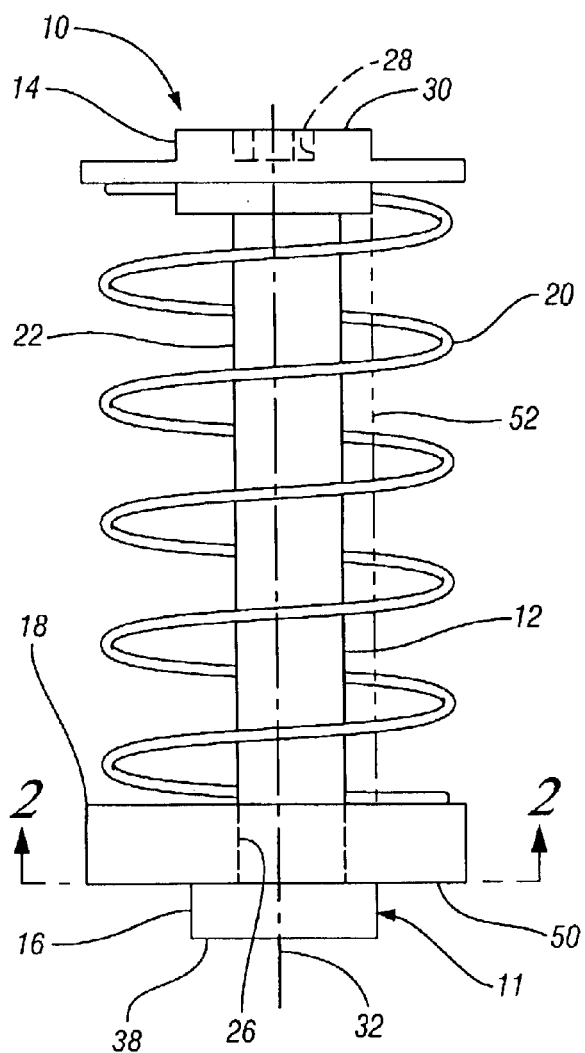
FIG. 1 is a side view of an exemplary embodiment of a friction stir rivet according to the invention.
Figure 2:
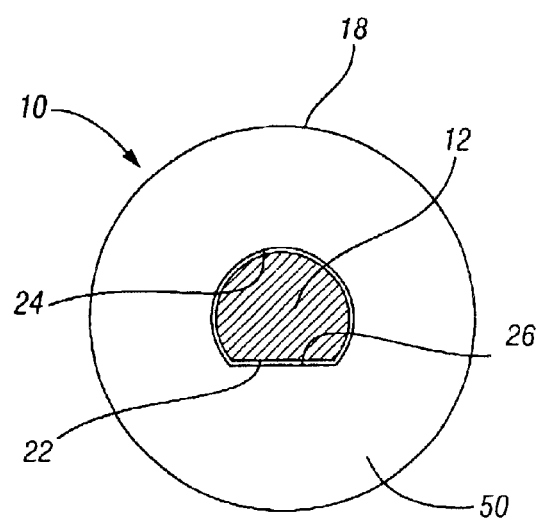
FIG. 2 is a cross-sectional view from the line 2—2 of FIG. 1.

Referring first to FIGS. 1 and 2 of the drawings in detail, numeral 10 generally indicates a friction stir rivet 10. Rivet 10 includes an elongated body 11 having a cylindrical section 12 with enlarged upper and lower stops 14, 16 at opposite ends of the cylindrical section 12. The cylindrical section 12 extends through a cap 18 and a spring 20. An interlocking guide 22 extends longitudinally along the cylindrical section 12. Preferably, the interlocking guide of cylindrical section 12 is a flat surface.

Cap 18 has a generally round central opening 24 fitted over the cylindrical section 12. The central opening 24 of the cap 18 has an interlocking guide 26 that mates with the interlocking guide 22 of the cylindrical section 12 and causes the cap 18 to rotate with the cylindrical section 12. Preferably, the interlocking guide 26 of the cap 18 is a flat surface.

The upper stop 14 forms the head of the rivet 10 and provides a physical barrier which compresses the spring 20 against the slideable cap 18, biasing the cap 18 toward the lower stop 16. A recessed socket 28 is centrally located on an upper portion 30 of the upper stop 14 and is aligned with a rotational axis 32 of the rivet 10. To rotate the rivet 10, a driving apparatus is inserted into the recessed socket 28 of the rivet 10.

Figure 3:
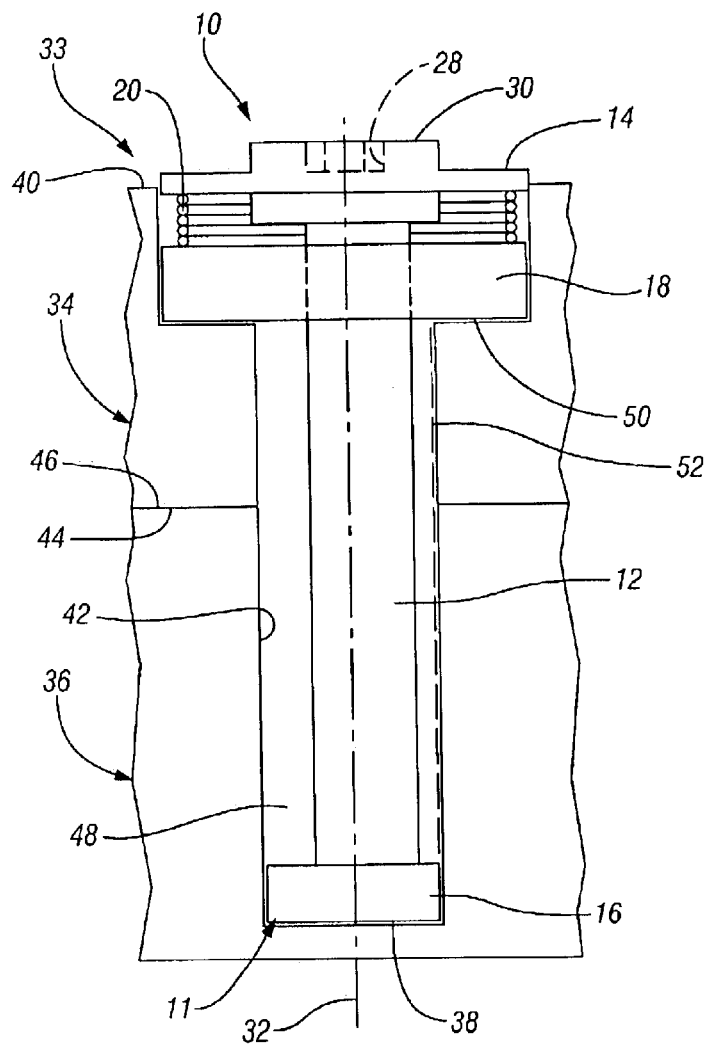
FIG. 3 is a cross-sectional view showing the friction stir rivet of FIG. 1 at the conclusion of rotation during stir riveting of two workpieces together.

Referring to FIG. 3, the rivet 10 is shown in use, forming an assembly 33 by stir riveting a first workpiece 34, such as a fusible aluminum sheet or plate, to a second workpiece 36, such as a fusible aluminum frame or other substrate. In operation, the rivet 10 is rotated around its rotational axis 32.

During rotation, downward force is applied to the rivet 10 causing a lower surface 38 of the lower stop 16 to frictionally contact an exposed surface 40 of the first workpiece 34. The downward force and rotation of the rivet 10 cause a portion of the first workpiece 34 to plasticize, allowing the rivet 10 to penetrate the workpiece 34 and create a cavity 42. As the rivet 10 is driven through an unexposed surface 44 of the first workpiece 34, rivet 10 frictionally contacts an unexposed surface 46 of the second workpiece 36. The downward force and rotation of rivet 10 cause a portion of the second workpiece 36 to plasticize, allowing rivet 10 to continue penetrating cavity 42. As the rivet 10 is driven through the first workpiece 34 into the second workpiece 36, the plasticized material 48 in cavity 42 is intermixed.

Shortly after the lower surface 38 of the rivet 10 penetrates the first workpiece 34, the underside 50 of the slideable cap 18 contacts the first workpiece 34 to create a seal around the stir site, thereby limiting the amount of plasticized material displaced out of the cavity 42. As the rivet 10 advances into the workpieces 34, 36, the cap 18 slides up the cylindrical section 12 of the rivet 10, against the force of spring 20 which forces the cap 18 to press against the first workpiece 34. The force of the cap 14 against the first workpiece 34 maintains the seal while the cap 18 travels up the cylindrical section 12 of the rivet 10. The cap 18 acts as a retaining element, limiting the amount of plasticized material escaping throughout the process.

Upon reaching a desired depth, motion is stopped as shown in FIG. 3 and the stir site is cooled to harden the plasticized material and provide an internally welded joint. The resulting assembly 33 is then held together partially by the mechanical shape of the rivet 10 and partially by the welding of the workpieces 34, 36, together with bonding to the rivet to form the assembly 33.

Preferably, rivet 10 is driven though the first workpiece 34 and partially into the second workpiece 36 until the cap 18 of the rivet 10 is partially recessed into the exposed surface 40 of the first workpiece 34. Thereafter, the rotary motion of rivet 10 is stopped, allowing locally plasticized material 48 to harden and form several welds. Rivet 10 forms a mechanical bond between the first workpiece 34 and the second workpiece 36. Plasticized material 48 preferably forms a diffusion bond between the rivet 10 and the first and the second workpieces 34, 36. Furthermore, the plasticized material 48 forms an interweld between the first workpiece 34 and the second workpiece 36.

The cylindrical section 12 of the body 11 of rivet 10 has a smaller radial thickness than the lower stop 16, to create a re-entrant section 52 along the cylindrical section 12. When the rivet 10 is embedded into the workpieces 34, 36 the re-entrant section 52 extends from the lower stop 16 up to the underside 50 of the cap 18 when the cap 18 is compressed against the upper stop 14. Allowing plasticized material 48 to fill in between the underside 50 of the cap 18 and the lower stop 16 of the rivet 10 increases the strength of the mechanical retention around the cylindrical section 12 of the rivet 10.

During the process, the slideable cap 18 restricts oxygen access to the rivet 10 by creating a seal between the rivet 10 and the first workpiece 34. The reduced oxygen supply around the rivet 10 reduces the formation of oxides on the cylindrical section 12 of the rivet 10, which provides a clean surface to form a bond with the plasticized material 48. Allowing formation of an oxide layer would interfere with bonding between the cylindrical section 12 and the plasticized material 48.

Figure 4:
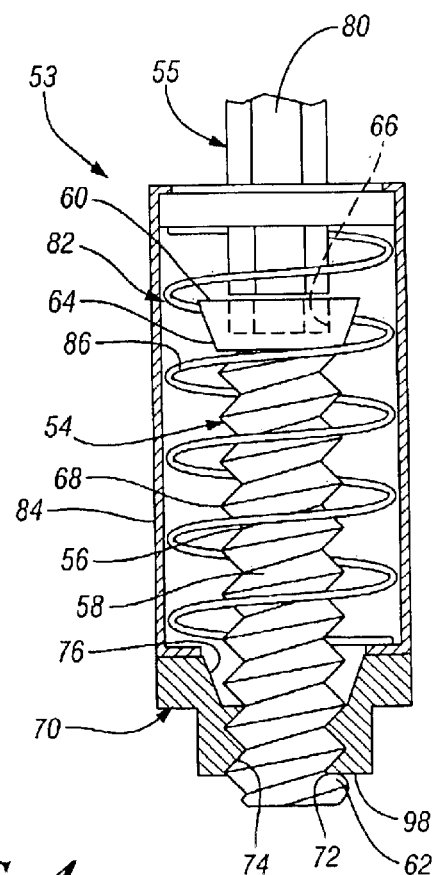
FIG. 4 is a cross-sectional view showing the combination of an alternative embodiment of friction stir rivet with associated rotary drive and biasing apparatus.
Figure 5:
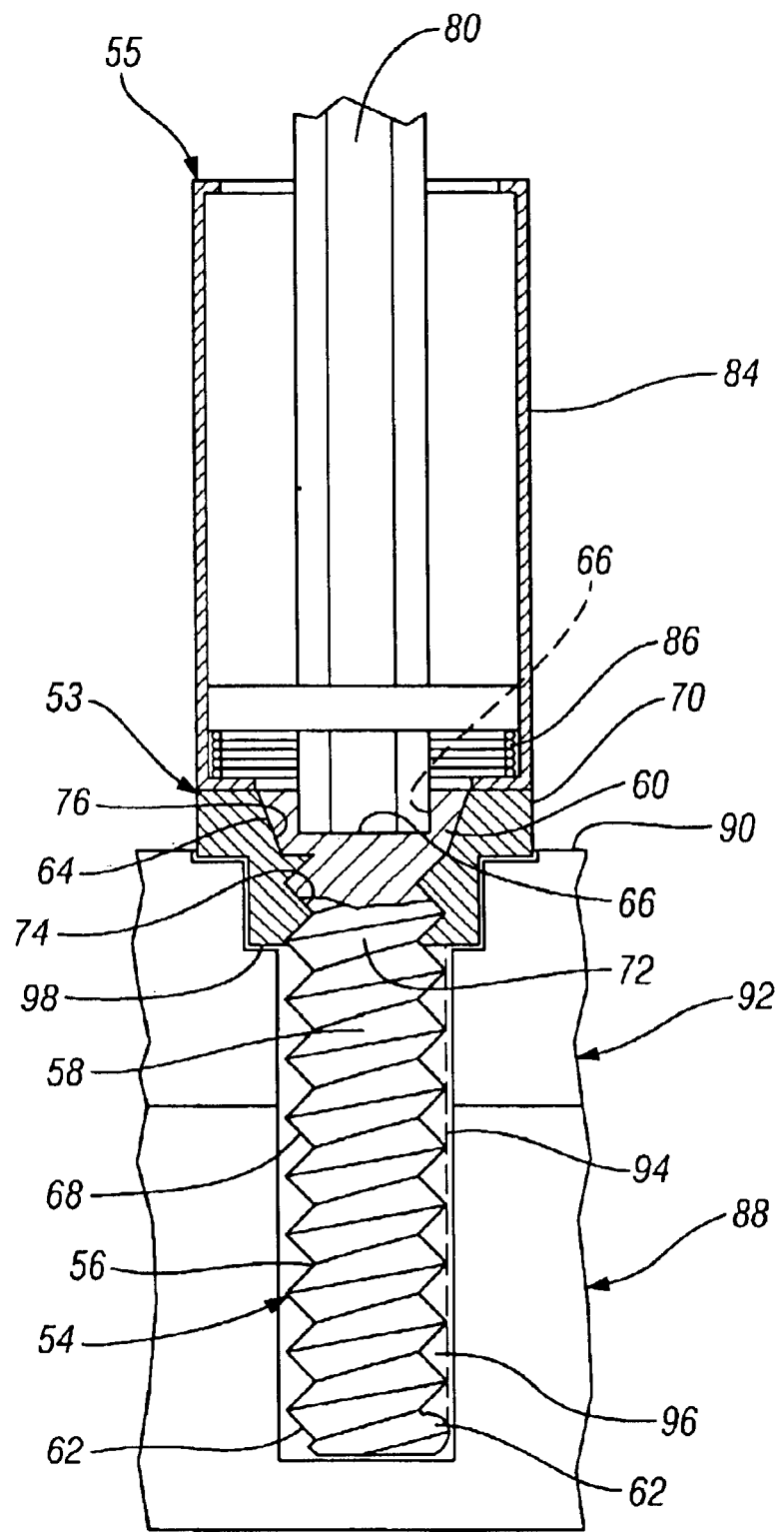
FIG. 5 is a cross-sectional view showing the combination of FIG. 4 at the conclusion of rotation of the rivet during stir riveting of two workpieces together.

FIGS. 4 and 5 show a combination 53 of an alternative embodiment of friction stir rivet 54 with an associated rotary drive and biasing apparatus 55. Rivet 54 includes an elongated body 56 having a cylindrical section 58, an enlarged upper stop 60 and a lower stop 62. The upper stop 60 has an angled side 64. A receiver, such as a recessed socket 66, is located on the upper stop 60. Threads 68, having a long lead, extend longitudinally along the cylindrical section 58 of the body 56.

A slideable cap 70 is carried on the threaded cylindrical section 58. Cap 70 has a central opening 72 including threads 74 engaging the threads 68 of the cylindrical section 58. The cap 70 has an angled side 76 mateable with the angled side 64 of the upper stop 60. During operation, the cap 70 slides up the threads 68 of the cylindrical section 58, rotating slightly until the cap 70 engages the upper stop 60.

To rotate the rivet 54, a driving apparatus 55, including a driver 80 and a biasing device 82, engages the rivet 54. The biasing device 82 surrounds the driver 80 and includes a telescoping retainer 84, housing a biasing spring 86.

In operation, the driver 80 engages the receiver 66 located on the upper stop 60 of the rivet 54, while the biasing device 82 urges the cap 70 towards the lower stop 62. As the rivet 54 is driven into the workpieces 88 the cap 70 rotates slightly as it slides up the threads 68 of cylindrical section 58 of the rivet 54, which compresses the biasing device 82 against the driver 80. The biasing spring 86, housed inside the retainer 84, continuously urges the cap 70 toward the lower stop 62, causing the cap 70 to maintain contact with the exposed surface 90 of the first workpiece 92. Upon reaching a desired depth, motion is stopped as shown in FIG. 5. Once rotational motion stops the driving apparatus 55, the retainer 84, and the spring 86 are disengaged from the rivet 54, leaving the rivet 54 fixed in the joined workpieces 88.

The threads 68 along the cylindrical section 58 of the rivet 54, create re-entrant portions 94 along the cylindrical section 58. When the rivet 54 is embedded in the workpieces 88, the re-entrant portions 94 receive some of the plasticized material 96 that fills in between the underside 98 of the cap 70 and the lower stop 62 of the body 54 to increase the strength of the mechanical retention around the cylindrical section 58 of the rivet 54.

During the process, the slideable cap 70 restricts oxygen access to the rivet 54 by creating a partial seal between the rivet and the first workpiece 92. The reduced oxygen supply around the rivet 54 reduces the formation of oxides on the cylindrical section 58 of the rivet 54, which provides a clean surface to form a bond with the plasticized material 96. Allowing formation of an oxide layer would interfere with bonding between the cylindrical section 58 and the plasticized material 96.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A method of joining first and second fusible workpieces at a point of engagement, comprising the steps of:

providing a rivet having a body formed of a material with a substantially higher melting point than that of the fusible workpieces wherein the body extends through a slideable cap;

rotating the body about a rotational axis and simultaneously driving the body downward through a first workpiece and into a second workpiece, thereby forming a cavity and plasticizing material surrounding the body;

engaging the cap against the first workpiece while the body slides through the cap until the upper stop engages the cap;

stopping further rotation and inward driving of the rivet after a desired depth is reached; and cooling the fusible workpieces and the rivet, until solidification of the plasticized material occurs whereby the fusible workpieces are held together by the solidified material and by the rivet retained within the workpieces at the point of engagement.

2. A method as in claim 1 including forming the rivet of a material compatible with that of the fusible workpieces such that during cooling of the plasticized material surrounding the rivet a diffusion bond is created between the rivet and the surrounding material.

3. A method as in claim 1 wherein the cooling step causes interwelding of the fusible workpieces.

4. A method as in claim 1 wherein the cooling step embeds the rivet to form a mechanical bond between the joined workpieces.

5. A method as in claim 1 including biasing the cap toward the first workpiece, thereby maintaining a full volume of plasticized material in the cavity while allowing excess material to escape.

6. A method as in claim 5 wherein the biasing step is performed by a spring.

7. A method as in claim 5 wherein maintaining the cavity full of the plasticized material limits oxygen from entering the cavity thereby reducing the formation of oxidation around the body.

8. A method as in claim 1 wherein the fusible workpieces are metal.

* * * * *